US008648507B2

(12) United States Patent
Chamberlin et al.

(10) Patent No.: US 8,648,507 B2
(45) Date of Patent: Feb. 11, 2014

(54) STATOR ASSEMBLY INCLUDING A TERMINAL BLOCK FOR AN ELECTRIC MACHINE

(75) Inventors: Bradley D. Chamberlin, Pendleton, IN (US); James J. Ramey, Fortville, IN (US); Koon Hoong Wan, Indianapolis, IN (US); Steven C. Burton, Anderson, IN (US); Larry A. Kubes, Climax, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 623 days.

(21) Appl. No.: 12/573,678

(22) Filed: Oct. 5, 2009

(65) Prior Publication Data

US 2010/0253164 A1 Oct. 7, 2010

(51) Int. Cl.
*H02K 5/22* (2006.01)
*H01B 17/30* (2006.01)
*H01R 9/24* (2006.01)
*H02K 11/00* (2006.01)

(52) U.S. Cl.
USPC ............................................ 310/71; 439/813

(58) Field of Classification Search
USPC .............................. 310/71; 439/813–815, 721
See application file for complete search history.

(56) References Cited

U.S. PATENT DOCUMENTS

| 3,283,186 | A | * | 11/1966 | Perry ................................ 310/71 |
| 3,510,822 | A | | 5/1970 | Patterson |
| 3,850,501 | A | * | 11/1974 | Butterfield et al. ........... 439/196 |
| 4,362,351 | A | * | 12/1982 | Wible ............................ 439/738 |
| 4,712,029 | A | * | 12/1987 | Nold ................................ 310/71 |
| 5,580,286 | A | * | 12/1996 | Kramer et al. ................. 439/813 |
| 5,752,852 | A | * | 5/1998 | Onoda ........................... 439/559 |
| 6,050,840 | A | | 4/2000 | Kowalski et al. |
| 6,628,024 | B1 | * | 9/2003 | Mirmobin ....................... 310/71 |
| 6,664,678 | B2 | * | 12/2003 | Shimizu .......................... 310/71 |
| 6,897,584 | B2 | * | 5/2005 | Doherty et al. .................. 310/71 |
| 6,963,150 | B2 | * | 11/2005 | Isoda et al. ...................... 310/71 |
| 7,193,344 | B2 | * | 3/2007 | Kabasawa et al. .............. 310/71 |
| 7,317,269 | B2 | * | 1/2008 | Boyland et al. ................. 310/71 |
| 7,633,198 | B2 | * | 12/2009 | Kirkman et al. ................ 310/71 |
| 7,893,581 | B2 | * | 2/2011 | Miura et al. ..................... 310/71 |
| 8,100,730 | B2 | | 1/2012 | Hara et al. |
| 8,362,665 | B2 | | 1/2013 | Chamberlin et al. |
| 2005/0218732 | A1 | * | 10/2005 | Boyland et al. ................. 310/71 |

FOREIGN PATENT DOCUMENTS

JP 03-150040 A * 6/1991 ............... H02K 5/00

* cited by examiner

*Primary Examiner* — Burton Mullins
(74) *Attorney, Agent, or Firm* — Cantor Colburn LLP

(57) ABSTRACT

An electric machine includes a housing having an outer surface and an inner surface that defines an interior portion. The housing also includes a connection zone having a first end portion that extends from the outer surface to a second end portion that is exposed to the interior portion. The connection zone includes a connection passage. A terminal block extends through the connection passage. The terminal block includes a non-electrically conductive member that is sealed against the connection passage, and an electrically conductive member covered by the non-electrically conductive member. The electrically conductive member includes a first end section that extends to a second end section through an intermediate section. The first end section has a first connection zone and the second end section has a second connection zone. The second connection zone is at an angle relative to the first connection zone.

19 Claims, 4 Drawing Sheets

STATOR ASSEMBLY INCLUDING A TERMINAL BLOCK FOR AN ELECTRIC MACHINE

BACKGROUND OF THE INVENTION

Exemplary embodiments pertain to the art of electrical machines and, more particularly, to a stator assembly including a terminal block for an electrical machine.

Many electrical machines, such as alternating current electric motors and generators, include a stator assembly and a rotor assembly arranged in a housing. High voltage leads pass from the stator assembly through the housing. In most cases, the high voltage leads, which take the form of copper bars having limited flexibility, exit axially from the housing and terminate at a terminal block. In many cases, axial space constraints exist that force a reduction in an overall length of the machine. Reducing the size of the machine often results in a corresponding reduction in machine performance. To provide an interface to the terminal block the leads usually include a ring connector. A similar ring connector is provided on an associated connecting cable. A bolt passes through each ring connector and into a threaded portion of the terminal block to form a connection to the electrical machine. At this point, additional covers, cavities, and/or seals are required to protect the connection from the elements, foreign object contact or to provide additional insulation between adjacent connections.

BRIEF DESCRIPTION OF THE INVENTION

Disclosed is an electric machine. The electric machine includes a housing having an outer surface and an inner surface that defines an interior portion. The housing also includes a connection zone having a first end portion that extends from the outer surface to a second end portion that is exposed to the interior portion. The connection zone includes a connection passage. A stator assembly is arranged within the interior portion of the housing. The stator assembly includes at least one connector lead. The stator assembly also includes a terminal block that extends through the connection passage. The terminal block includes a non-electrically conductive member that is sealed against the connection passage, and at least one electrically conductive member covered by the non-electrically conductive member. The at least one electrically conductive member includes a first end section that extends to a second end section through an intermediate section. The first end section has a first connection zone that is electrically coupled to the at least one connector lead and the second end section has a second connection zone. The second connection zone is at an angle relative to the first connection zone.

Also disclosed is a stator assembly including a terminal block for an electric machine. The stator assembly includes at least one connector lead and terminal block that is electrically coupled to the at least one connector lead. The terminal block includes a non-electrically conductive member, and at least one electrically conductive member covered by the non-electrically conductive member. The at least one electrically conductive member includes a first end section that extends to a second end section through an intermediate section. The first end section has a first connection zone that is electrically coupled to the at least one connector lead and the second end section has a second connection zone. The second connection zone is at an angle relative to the first connection zone.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
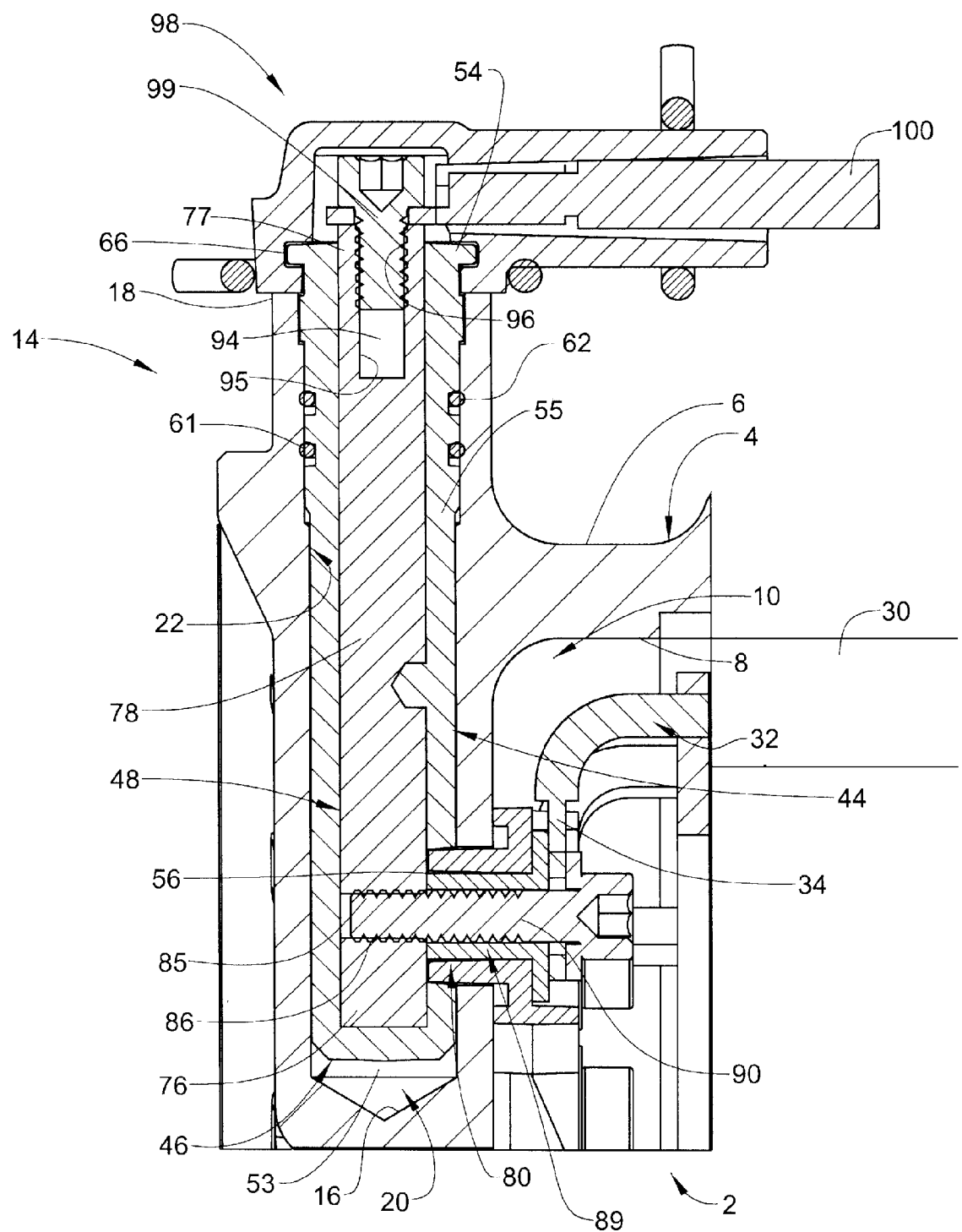
FIG. 1 is a partial cross-sectional view of an electric machine including a stator assembly having a terminal block in accordance with an exemplary embodiment.
Figure 2:
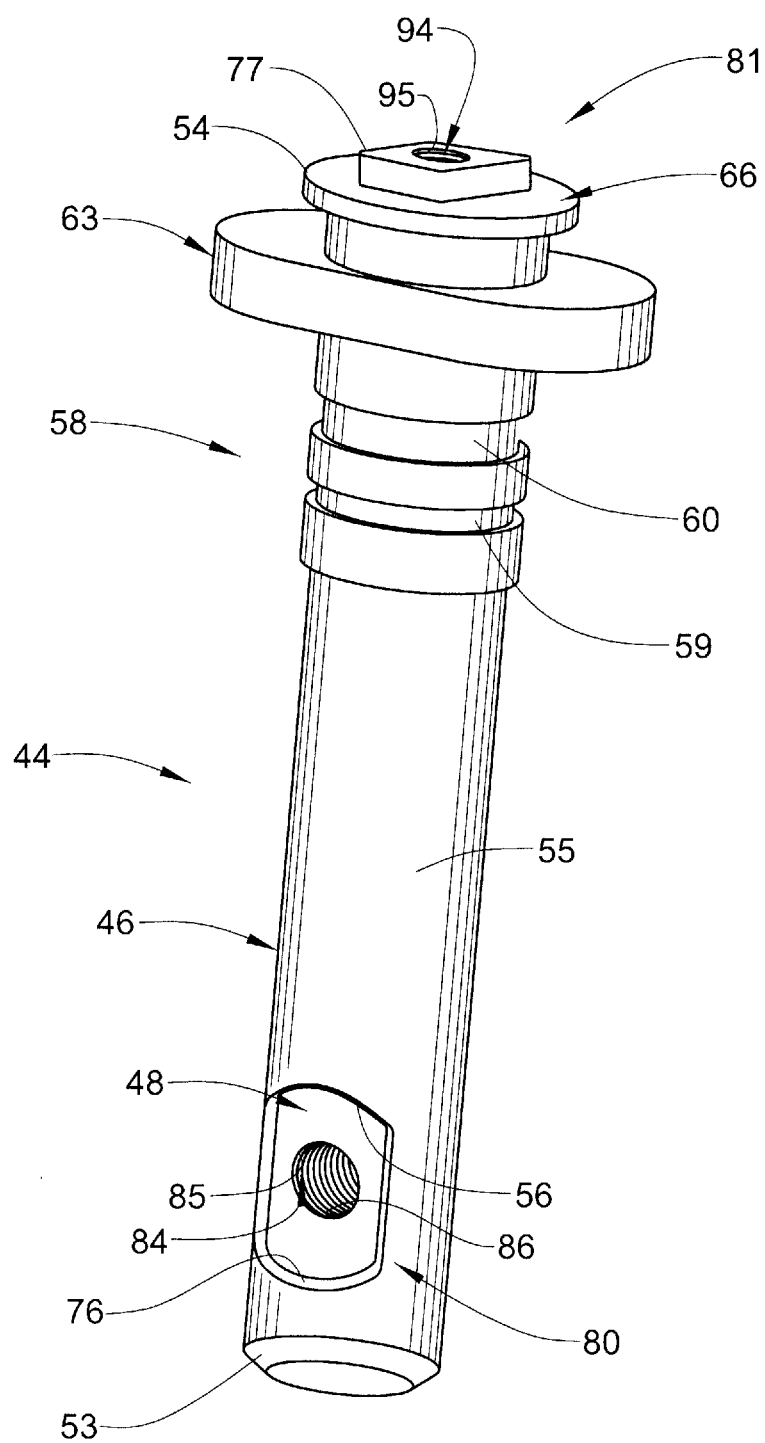
FIG. 2 is a perspective view of the terminal block of FIG. 1.

A detailed description of one or more embodiments of the disclosed apparatus is presented herein by way of exemplification. As shown in FIGS. 1 and 2, an electric machine that takes the form of an electric motor in accordance with an exemplary embodiment is indicated generally at 2. Electric motor 2 includes a housing 4 having an outer surface 6 and an inner surface 8 that defines an interior portion 10. Housing 4 includes a connection zone 14 having a first end portion 16 that extends to a second end portion 18 through a connection passage 20 provided with an inner wall 22. In the exemplary embodiment shown, electric motor 2 includes a stator assembly 30 having a connector lead 32 provided with a ring connector 34. As will be detailed more fully below, stator assembly 30 includes a terminal block 44 that provides an interface between electric motor 2 and external components (not shown).

Terminal block 44 includes a non-electrically conductive member 46 that covers or encapsulates, at least in part, an electrically conductive member 48. More specifically, in one embodiment, non-electrically conductive member 46 is over molded onto electrically conductive member 48. In any event, non-electrically conductive member 46 includes a first end 53 that extends to a second end 54 through an intermediate portion 55. As shown, first end 53 includes an opening 56 that provides access to electrically conductive member 48. Second end 54 includes a seal land 58 including first and second grooves 59 and 60 that are configured to receive corresponding first and second seals 61 and 62. In accordance with an exemplary embodiment, seals 61 and 62 are configured and disposed to fluidly seal non-electrically conductive member 46 within connection passage 20. However, seals 61 and 62 can provide a non-fluidic seal and simply prevent foreign debris from entering electric motor 2. Second end 54 is also shown to include a flange 63 and a lip 66. As will be detailed more fully below, lip 66 provides a robust attachment point for external connectors.

Electrically conductive portion 48 includes a first end section 76 that extends to a second end section 77 through an intermediate section 78. First end section 76 includes a first connection zone 80 for connecting with stator assembly 30 and second end section 77 includes a second connection zone 81 that serves as an exterior connection point. In accordance with an exemplary embodiment, first connection zone 80 is at an angle relative to second connection zone 81 in order to provide a compact form factor for electric machine 2 without necessitating a reduction in size of housing 4 and, by extension, a reduction in stator assembly 30 which would result in reduced performance. As shown, first connection zone 80 is substantially perpendicular relative to second connection zone 81. Substantially perpendicular should be understood to mean that first connection zone 80 is at a 90°± about 10° angle relative to second connection zone 81. However, other angles from 0°-180° can also be employed. In addition, to providing a connection point, terminal block 44 shields the motor connections from environmental conditions as well as from inadvertent contact.

First connection zone 80 includes an orifice 84 having a circumferential wall portion 85 provided with a plurality of threads 86. With this arrangement, a connector member 89 extends through housing 4 and into first end section 76 of electrically conductive portion 48. A fastener 90 extends through ring connector 34, into connector member 89, and engages threads 86 to establish a positive connection between stator assembly 30 and terminal block 44. Similarly, second connection zone 81 includes an orifice 94 having a circumferential wall portion 95 provided with a plurality of threads 96. With this arrangement, a clip 98 is fastened to second end 54 of non-electrically conductive portion 46. Clip 98 engages with lip 66 to ensure a robust attachment. Clip 98 is shown to include a fastener 99 that secures an external interface conductor 100 to connection zone 81. Interface conductor 100 can provide line voltage to electric motor 2 or conduct electricity away if electric motor 2 is configured as a generator.

Figure 3:
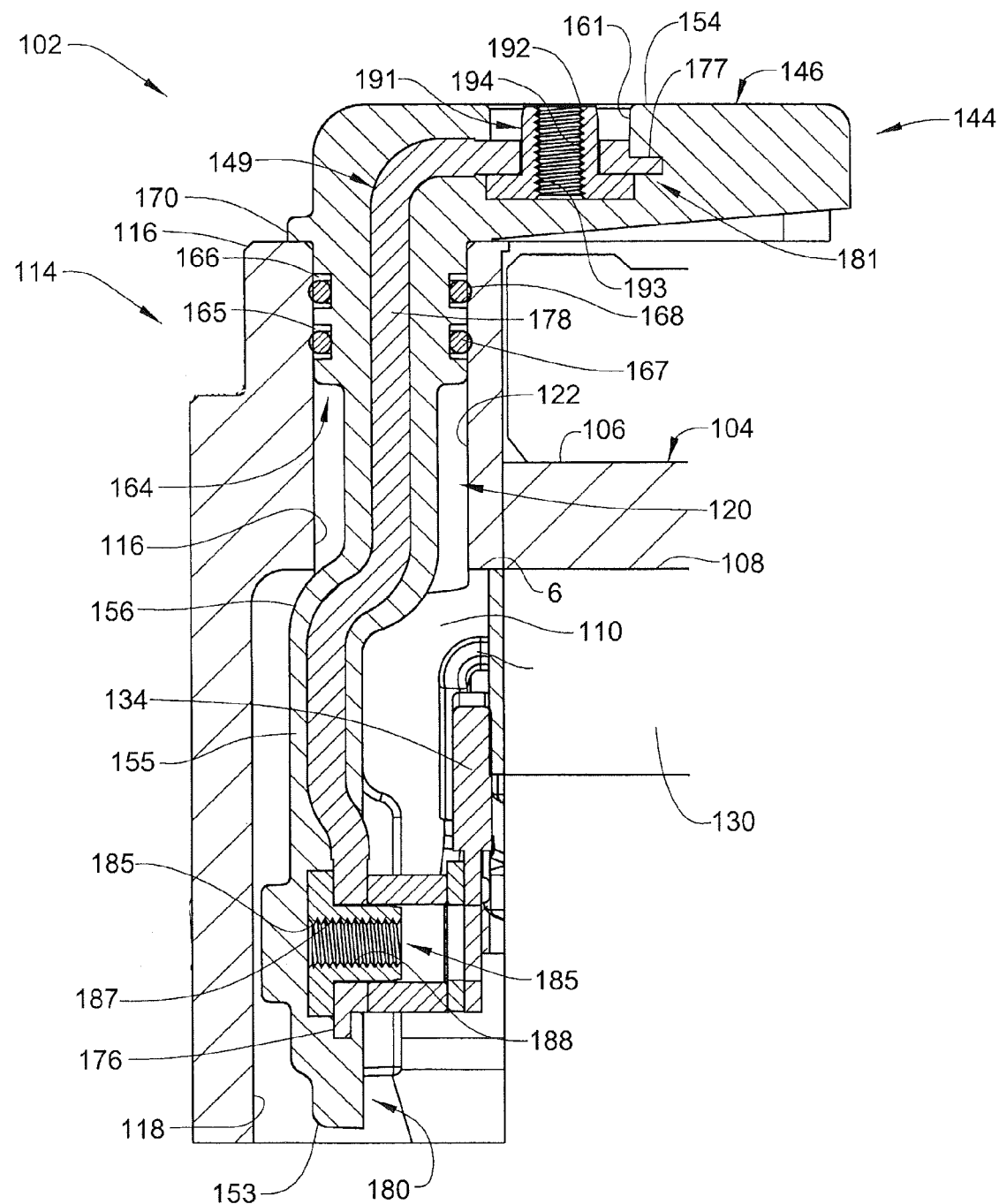
FIG. 3 is a partial cross-sectional view of an electric machine including a stator assembly having a terminal block in accordance with another exemplary embodiment.
Figure 4:
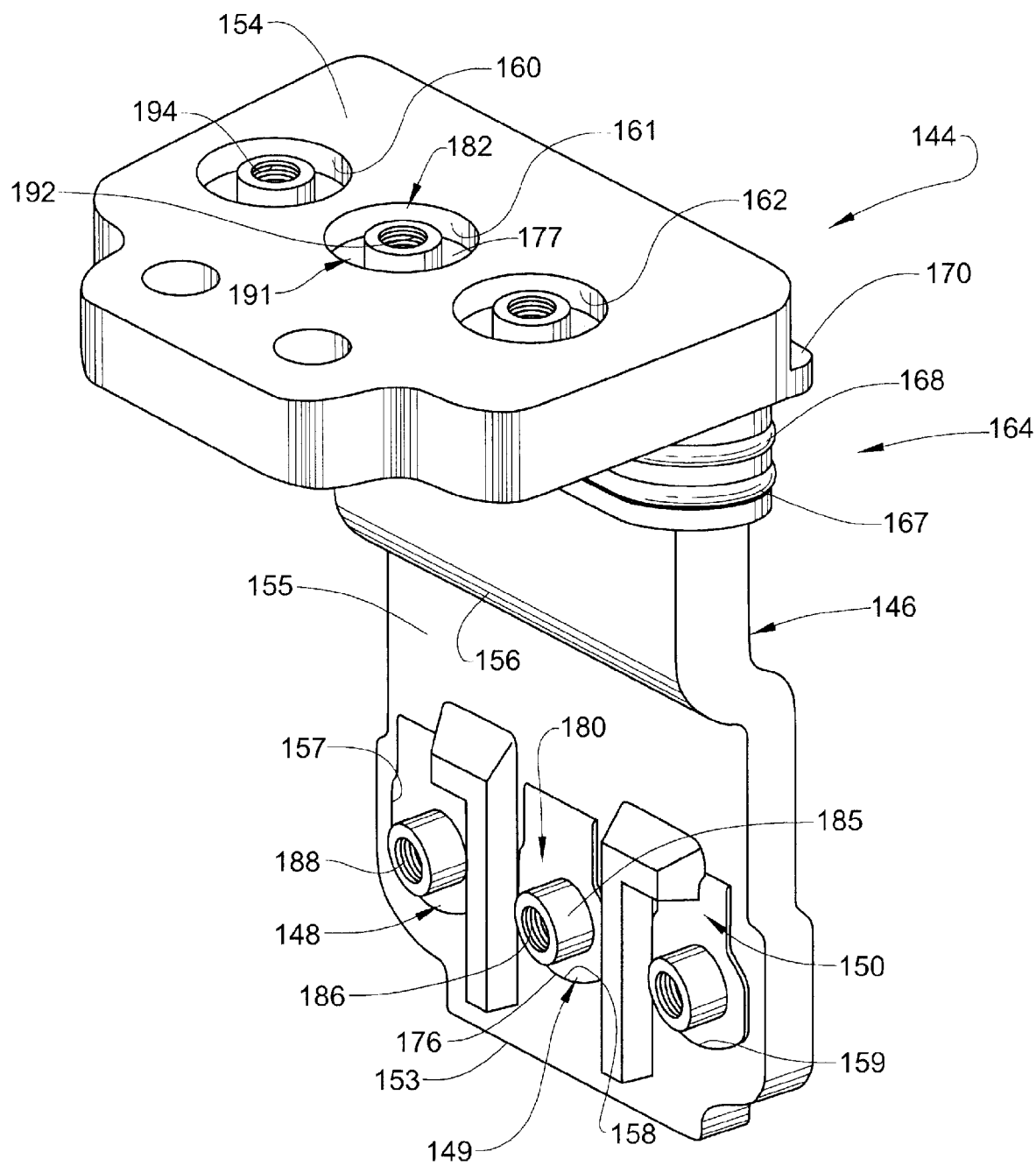
FIG. 4 is a perspective view of the terminal block of FIG. 3.

Reference will now follow to FIGS. 3 and 4 in describing an electric machine shown in the form of an electric motor 102 constructed in accordance with another exemplary embodiment. As shown, electric motor 102 is a multi-phase motor and includes a housing 104 having an outer surface 106 and an inner surface 108 that defines an interior portion 110. Housing 104 includes a connection zone 114 having a first end portion 116 that extends to a second end portion 118 through a connection passage 120 provided with an inner wall 122. In the exemplary embodiment shown, electric motor 102 includes a stator assembly 130 having a plurality of connector leads, one of which is indicated at 132. Connector lead 132 is provided with a ring connector 134. As will be detailed more fully below, stator assembly 130 includes a terminal block 144 provides an interface between electric motor 102 and external components (not shown).

Terminal block 144 includes a non-electrically conductive member 146 that covers or encapsulates, at least in part, a plurality of electrically conductive members 148-150. More specifically, non-electrically conductive member 146 is over molded onto electrically conductive members 148-150. In any event, non-electrically conductive member 146 includes a first end 153 that extends to a second end 154 through an intermediate portion 155 having a stepped zone 156. As shown, first end 153 includes a plurality of openings 157-159 that provides access to electrically conductive members 148-150, respectively. Similarly, second end 154 includes a plurality of openings 160-162 that likewise provide access to electrically conductive members 148-150, respectively. Second end 154 also includes a seal land 164 including first and second grooves 165 and 166 that are configured to receive corresponding first and second seals 167 and 168. In accordance with an exemplary embodiment, seals 167 and 168 are configured and disposed to fluidly seal non-electrically conductive member 146 within connection passage 120. However, seals 167 and 168 can provide a non-fluidic seal and simply prevent foreign debris from entering electric motor 102. Second end 154 is further shown to include a flange 170.

As each electrically conductive portion is substantially the same, a detailed description will follow referencing electrically conductive portion 149 with an understanding that the remaining electrically conductive portions 148 and 150 include similar structure. Electrically conductive portion 149 includes a first end section 176 that extends to a second end section 177 through an intermediate section 178. First end section 176 includes a first connection zone 180 for connecting with stator assembly 130 and second end section 177 includes a second connection zone 181 that serves as an exterior connection point. In accordance with an exemplary embodiment, first connection zone 180 is at an angle relative to second connection zone 181 in order to provide a compact form factor for electric machine 102 without necessitating a reduction in size of housing 104 and, by extension, a reduction in stator assembly 130 which would result in reduced performance. As shown, first connection zone 80 is substantially perpendicular relative to second connection zone 81. Substantially perpendicular should be understood to mean that first connection zone 80 is at a 90°± about 10° angle relative to second connection zone 81. However, other angles from 0°-180° can also be employed. In addition, to providing a connection point, terminal block 144 shields the motor connections points from environmental conditions as well as inadvertent contact.

First connection zone 180 includes connector member 185 having an orifice 186. Orifice 186 includes a circumferential wall portion 187 provided with a plurality of threads 188. With this arrangement, connector member 185 connects with ring connector 134 to establish a positive connection between stator assembly 130 and terminal block 144. Similarly, second connection zone 181 includes a connector member 191 having an orifice 192. Orifice 192 includes a circumferential wall portion 193 provided with a plurality of threads 194. With this arrangement, connector member 191 serves as an interface to an external conductor (not shown).

At this point it should be understood that the exemplary embodiments provide a robust motor attachment terminal that connects leads that extend axially from a motor housing, with external conductors while maintaining a compact form factor without sacrificing motor performance. In addition, the terminal block shields all connecting points from environmental conditions an inadvertent contact.

While the invention has been described with reference to an exemplary embodiment or embodiments, it will be understood by those skilled in the art that various changes may be made and equivalents may be substituted for elements thereof limitation with reference to the Figures without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:
1. An electric machine comprising:
a housing including an outer surface and an inner surface that defines an interior portion, the housing including a connection zone having a first end portion that extends from the outer surface to a second end portion that is exposed to the interior portion, the connection zone including a connection passage; and
a stator assembly arranged within the interior portion of the housing, the stator assembly including at least one connector lead, and a terminal block extending through the connection passage, the terminal block comprising:
a non-electrically conductive member having a first end that extends to a second end through an intermediate portion, the intermediate portion including at least one seal land that is configured and disposed to receive a seal member that provides a seal between the non-electrically conductive member and the connection passage; and at least one electrically conductive member covered by the non-electrically conductive member, the at least one electrically conductive member including a first end section interior to the housing that extends to a second end section exterior to the housing through an intermediate section, the second end section being angled relative to at least a portion of the intermediate section, the first end section having a first connection zone that is electrically coupled to the at least one connector lead and the second end section having a second connection zone, the second connection zone being at an angle relative to the first connection zone.

2. The electric machine according to claim 1, wherein the first connection zone is substantially perpendicular relative to the second connection zone.

3. The electric machine according to claim 2, wherein the terminal block includes a seal land, the seal land being formed in the non-electrically conductive member, the seal land including at least one groove formed in the non-electrically conductive member.

4. The electric machine according to claim 3, further comprising: a seal positioned in the at least one groove.

5. The electric machine according to claim 1, wherein the first connection zone includes an orifice having a circumferential wall portion, the circumferential wall portion including a plurality of threads.

6. The electric machine according to claim 5, wherein the second connection zone includes an orifice having a circumferential wall portion, the circumferential wall portion including a plurality of threads.

7. The electric machine according to claim 6, wherein the first connection zone comprises a first connection member and the second connection zone comprises a second connection member.

8. The electric machine according to claim 7, wherein the first connection member extends through the first end section of the at least one electrically conductive member and the second connection member extends through the second end section of the at least one electrically conductive member.

9. The electric machine according to claim 1, wherein the at least one electrically conductive member comprises a plurality of electrically conductive members.

10. The electric machine according to claim 9, wherein the plurality of electrically conductive member includes a first electrically conductive member, a second electrically conductive member and a third electrically conductive member.

11. The electric machine according to claim 10, wherein the first electrically conductive member is insulated from the second electrically conductive member and the third electrically conductive member is insulated from the first and second electrically conductive members.

12. A stator assembly for an electric machine, the terminal block comprising:
at least one connector lead extending from the stator assembly; and
a terminal block electrically linked to the at least one connector lead, the terminal block comprising:
a non-electrically conductive member having a first end that extends to a second end through an intermediate portion, the intermediate portion including at least one seal land that is configured and disposed to receive a seal member that provides a seal between the non-electrically conductive member and the electric machine; and
at least one electrically conductive member covered by the non-electrically conductive member, the at least one electrically conductive member including a first end section interior to the housing that extends to a second end section exterior to the housing through an intermediate section, the second end section being angled relative to at least a portion of the intermediate section, the first end section having a first connection zone that is electrically coupled to the at least one connector lead and the second end section having a second connection zone, the second connection zone being at an angle relative to the first connection zone.

13. The stator assembly according to claim 12, wherein the first connection zone is substantially perpendicular relative to the second connection zone.

14. The stator assembly according to claim 13, wherein the terminal block includes a seal land formed in the non-electrically conductive exterior member, the seal land including at least one groove formed in the non-electrically conductive member.

15. The stator assembly according to claim 12, wherein the first connection zone includes an orifice having a circumferential wall portion, the circumferential wall portion including a plurality of threads and the second connection zone includes an orifice having a circumferential wall portion, the circumferential wall portion including a plurality of threads.

16. The stator assembly according to claim 15, wherein the first connection zone comprises a first connection member and the second connection zone comprises a second connection member.

17. The stator assembly according to claim 16, wherein the first connection member extends through the first end section of the at least one electrically conductive member and the second connection member extends through the second end section of the at least one electrically conductive member.

18. The stator assembly according to claim 12, wherein the at least one electrically conductive member comprises a plurality of electrically conductive members.

19. The stator assembly according to claim 18, wherein the plurality of electrically conductive member includes a first electrically conductive member, a second electrically conductive member and a third electrically conductive member, wherein the first electrically conductive member is insulated from the second electrically conductive member and the third electrically conductive member is insulated from the first and second electrically conductive members.

* * * * *